United States Patent [19]
Hall

[11] Patent Number: 5,967,200
[45] Date of Patent: Oct. 19, 1999

[54] ENGINE FLUID CATCH BAG

[76] Inventor: Thomas W. Hall, 4120 NE. 22nd Terrace, Lighthouse Point, Fla. 33064

[21] Appl. No.: 08/987,822

[22] Filed: Dec. 10, 1997

[51] Int. Cl.⁶ .................................................. B65B 1/04
[52] U.S. Cl. .................. 141/86; 141/311 A; 141/114; 184/106
[58] Field of Search ............................ 141/86–88, 311 A, 141/114; 184/106, 1.5; 180/69.1

[56] References Cited

U.S. PATENT DOCUMENTS

| | | | |
|---|---|---|---|
| 3,918,542 | 11/1975 | Murillo | 184/106 |
| 4,054,184 | 10/1977 | Marcinko | 184/106 |
| 4,936,418 | 6/1990 | Clausen | 184/106 |
| 5,099,872 | 3/1992 | Tarvin et al. | 141/114 |
| 5,526,900 | 6/1996 | Mason | 141/86 |
| 5,620,018 | 4/1997 | Carpenter et al. | 141/114 |

*Primary Examiner*—Steven O. Douglas
*Attorney, Agent, or Firm*—Robert M. Downey, P.A.

[57] ABSTRACT

A fluid catch bag sized and configured for placement below an engine, and particularly an inboard engine on a boat, includes a floor, side walls and end walls formed of a flexible, liquid impervious material and surrounding an interior fluid collection chamber. The upper peripheral edge zones of the side walls and end walls are provided with eyelets for attaching the catch bag in operative position below the engine so that the walls extend generally vertically and upwardly from the floor in surrounding relation to the engine. A collapsible bladder interconnects in fluid flow communication with a lower portion of the collection chamber for containing the engine fluids which drip into the catch bag. A shut-off valve allows for disconnection of the bladder in order to dispose of the fluid contents contained therein, while preventing fluids within the chamber of the catch bag from spilling when the bladder is disconnected.

13 Claims, 3 Drawing Sheets

ENGINE FLUID CATCH BAG

BACKGROUND OF THE INVENTION

1. Field of the Invention

This invention relates to an apparatus for collecting engine fluids which drip from various parts of an engine and, more particularly, to a catch bag formed of a flexible, liquid impervious material adapted for installation below an engine and including side walls which extend upwardly from a bottom of the catch bag along the sides and front of the engine, and a bladder for collecting the engine fluids which drip into the catch bag.

2. Description of the Related Art

The loss of engine fluids such as oil, grease, hydraulic fluid and water, which drip from various parts of an engine, is a well-known and commonly encountered problem. Typically, engine fluids leak from hose connections and locations where there are gaskets or seals, including the flywheel seal, the crank case transmission seal, and the differential. In other instances, leaks develop as a result of wear and corrosion of engine parts. This is especially common on boats, and particularly with inboard engines which are subjected to exposure to salt water and other corrosive elements. Because most inboard engines sit just above the bottom of the bilge, it is not uncommon for the lower portion of the engine to be exposed to sea water in the bilge. Over time, the oil pan on the bottom of the engine may rust through, resulting in a loss of all of the engine's oil which spills into the bilge of the vessel.

The loss of engine fluids from boat engines is particularly problematic due to environmental laws and Coast Guard restrictions which prohibit overboard discharge of fluids containing hazardous materials or contaminants. As occurs on most boats, sea water and/or fresh water normally accumulates in the bilge and is subsequently pumped overboard to reduce weight and to promote stability of the vessel. Some boats may take on water through leaky seals or cracks in the hull, requiring routine discharge, by operation of a bilge pump with a float switch, in order to prevent the vessel from taking on too much water which may eventually sink the boat. However, if engine fluids drip into the bilge water as a result of engine wear, deterioration of gaskets and seals, or normal operation of lubricated moving parts, then it may be unlawful to thereafter pump the bilge water overboard and into the surrounding sea.

In the past, others have proposed use of absorbent drip pads for placement below an engine in order to absorb oil, grease, hydraulic fluids and the like which drip from the engine. These absorbent drip pads have been primarily designed for use in connection with automobile engines, wherein the absorbent drip pad is placed on the ground surface (e.g., on the garage floor) below the vehicle's engine so that fluids which drip from the engine while the vehicle is parked become absorbed into the drip pad. Examples of oil drip pads of this nature are shown in the U.S. patents to Fay, U.S. Pat. No. 3,316,995; Tribuzi, U.S. Pat. No. 3,331,652; and Garnatz, et al., U.S. Pat. No. 4,875,537. While the various absorbent pads disclosed in these patents may be suitable for their intended use, they are not adequate for use on motor vessels. Specifically, use of such absorbent pads in the bilge of a motor vessel would cause the pads to become saturated with water which normally collects in the bilge, thus significantly limiting the oil absorbing capacity. Further, removal of an oil absorbent pad from the bilge would present significant problems, especially if saturated with water, due to the excessive weight of the pad. This may result in the pad tearing when attempting to remove it from the confined space below the engine in order to replace the pad. Further, the used absorbent pad, saturated with oil and other contaminants, must be disposed of in accordance with EPA guidelines as well as municipal, state and federal laws. Due to its relatively large size and difficulty in handling, disposal of oil absorbent pads can be considerably costly. Furthermore, absorbent pads are not capable of handling large quantities of fluids. This presents a problem in the instance the engine loses its oil, such as may result if the oil pan rusts through as described above. Typically, a large diesel engine may contain at least 12 gallons of oil. Absorbent pads of the type disclosed in the above patents are unable to recover such large volumes of fluid.

The patent to Mason, U.S. Pat. No. 5,526,900, discloses a vehicle fluid catcher which has side walls and bendable top portions. The fluid catcher in Mason is designed to be secured to the under side of an automobile, using springs, so that the fluid catcher is positioned below the engine. The Mason fluid catcher would not be suitable for use on a vessel due to the sloped side walls which would are not adequate to contain fluid within the catcher as the vessel pitches and rolls in rough seas. Further, the Mason fluid catcher relies on absorbent pads to contain the fluid. As described above, absorbent pads of this nature are not sufficient to contain large volumes of fluid. Furthermore, use of absorbent pads severely limits the ability to retrieve the oil, thereby requiring disposal of the entire fluid catching device.

SUMMARY OF THE INVENTION

An engine fluid catch bag structured to be supported below an engine, such as an inboard engine on a motor vessel, for capturing oil and fluids which drip from the engine. The catch bag is constructed from a flexible, durable material to enable manipulation through narrow, confined areas when installing and removing the catch bag in operative position below the engine. In a preferred embodiment, the catch bag is cut to size from a canvas or like material sheet which has been impregnated with a rubber composition and/or treated in such a manner which makes the material impervious to liquid penetration. One or more panels of the flexible material are then folded, sewn, stitched, heat welded and/or otherwise adjoined along aligned edges using methods well known in the field to provide water-tight seams. When constructed, the catch bag includes longitudinal side walls and opposite end walls extending upwardly from a floor to define a tub-like structure, wherein the walls and floor surround a fluid capture chamber.

The top edge of each of the opposite end walls includes an outwardly extending lip which is shaped and configured to conform generally to the engine configuration above the lip. It is preferred that the lips at each end be of a semi-rigid nature which may be accomplished by reinforcing the flexible canvas material with a plastic or metal plate. The lips should be supported at an angled orientation that will direct fluid which drips in their top surface into the capture chamber.

Means are provided along an upper peripheral zone of the side walls and end walls or lips for securing the catch bag in operative position below the engine. In a preferred embodiment, eyelets are provided at spaced peripherals along the upper peripheral zones of the side walls and the lips. Attaching means such as plastic ties, rope, cord, spring hooks, clips magnets or the like are fitted to select eyelets (or other areas along the upper periphery of the walls) for securing the catch bag to various structure along the sides and ends of the engine.

A flexible hose is fitted to the catch bag at a preferred location so that engine fluid captured in the chamber will flow by gravity through the hose to a collection bladder removably fitted to a distal end of the hose. A shut-off valve is provided along the hose so that fluid flow through the hose can be interrupted when removing the collection bladder for disposal, thereby preventing hazardous material spills which may otherwise result when the distal end of the hose is disconnected from the bladder.

BRIEF DESCRIPTION OF THE DRAWINGS

For a fuller understanding of the nature of the present invention, reference should be had to the following detailed description taken in conjunction with the accompanying drawings in which.

Like reference numerals refer to like parts throughout the several views of the drawings.

DETAILED DESCRIPTION OF THE PREFERRED EMBODIMENT

Figure 1:
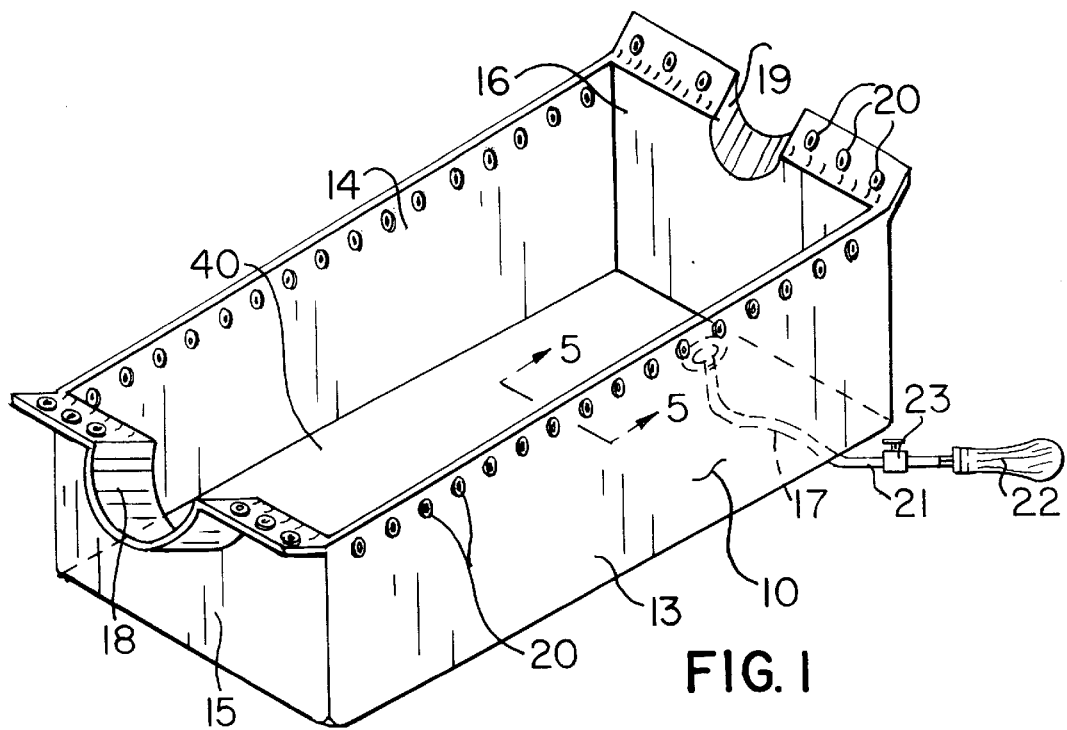
FIG. 1 is an isolated top perspective view of the preferred embodiment of the engine fluid catch bag.
Figure 2:
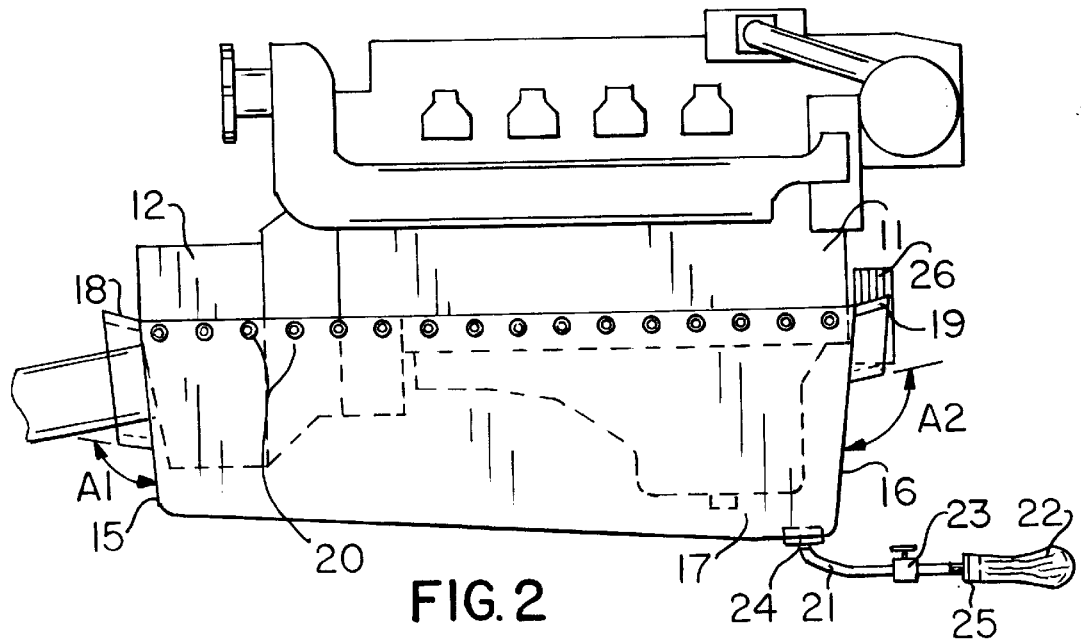
FIG. 2 is a right side view of an engine and transmission assembly with the engine fluid catch bag suspended thereunder.
Figure 3:
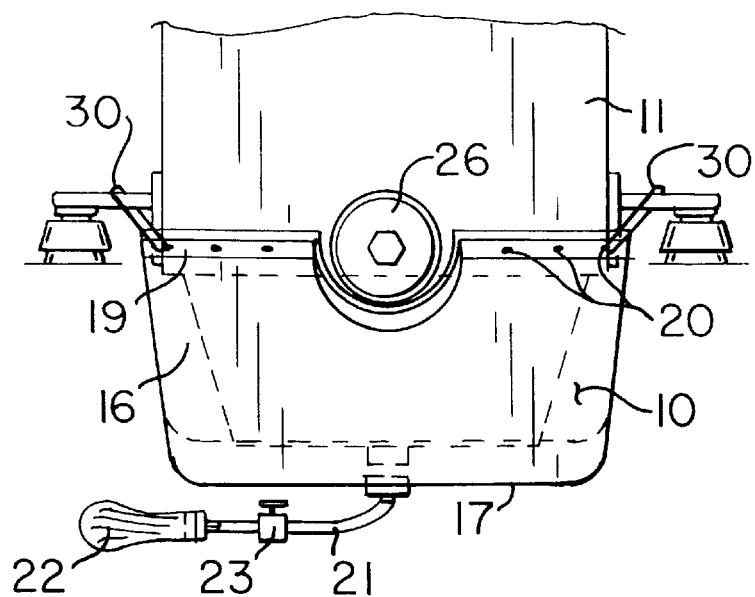
FIG. 3 is a front view of an engine and transmission assembly with the engine fluid catch bag suspended thereunder.
Figure 4:
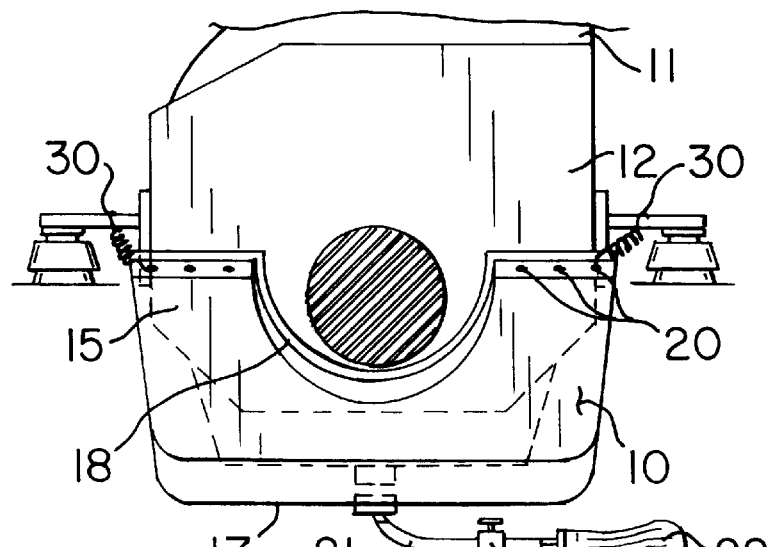
FIG. 4 is a rear view of an engine and transmission assembly with the engine fluid catch bag suspended thereunder.

Referring to FIG. 2, the, engine fluid catch bag 10 is shown suspended below the underside of an engine 11 and/or transmission 12, such as an inboard engine and transmission on a motor vessel. The engine fluid catch bag captures fluids which drip from the engine 11 and/or transmission 12 which would otherwise enter the bilge and possibly contaminate the environment if pumped overboard.

The engine fluid catch bag 10 is constructed from a flexible, durable material, to enable manipulation through narrow, confined areas when installing and removing the catch bag in operative position below the engine 11 and/or transmission 12. In the preferred embodiment, the catch bag 10 is cut to size from a canvas or like material sheet which has been impregnated with a rubber composition and/or treated in such a manner which makes the material impervious to liquid penetration and resistant to chemical breakdown when in contact with salt water, engine oils and lubricants.

One or more panels of the flexible material are then folded, sewn, stitched, heat welded and/or otherwise adjoined along aligned edges using methods well known in the field to provide water-tight seams. When constructed, the catch bag 10 includes longitudinal side walls 13 and 14 and opposite end walls 15 and 16 extending upwardly from a floor to define a tub-like structure, wherein the walls and floor surround a fluid capture chamber 17. In the preferred installation, the walls of the catch bag 10 will extend beyond all sides of the lower parts of the engine 11 and transmission 12 to a level at least as high as the center of the flywheel 26.

The top edge of each of the opposite end walls 15 and 16 includes outwardly extending lips 18 and 19 shaped and configured to conform generally to the engine 11 and transmission 12 configurations above the lips as shown in the figures. It is preferred that the lips 18 and 19 at each end be of a semi-rigid nature which may be accomplished by reinforcing the flexible canvas material with a plate made of plastic or metal. The lips 18 and 19 should be supported at an angled orientation so that fluid which drips on their top surface will be directed into the capture chamber 17. In the preferred embodiment, the angle between the lips 18 and 19 and the opposite end walls 15 and 16, angles A1 and A2, respectively, is approximately 120°. The center of the lips 18 and 19 are contoured in a semi-circular fashion to allow the catch bag 10 to be installed to a level at least as high as the center of the flywheel 26. Most engine/transmission leaks occur at the flywheel seal and/or transmission seal and these components are spinning. The lips 18 and 19 are therefore long enough to catch any drip from these areas without physical attachment to the spinning components.

Means are provided along an upper peripheral zone of the side walls 13 and 14 and end walls 15 and 16 or lips 18 and 19 for securing the catch bag 10 in operative position below the engine 11 and/or transmission 12. In a preferred embodiment, eyelets 20 made of metal or plastic are provided at spaced peripherals along the upper peripheral zones of the side walls 13 and 14 and the lips 18 and 19. Attaching means 30 such as plastic ties, rope, cord, spring hooks, clips, magnets or the like are fitted to select eyelets 20 (or other areas along the upper periphery of the walls) for securing the catch bag to various structure along the sides and ends of the engine. In the preferred embodiment, there will be sufficient eyelets to allow for installation into a variety of different engine compartment types.

Figure 5:
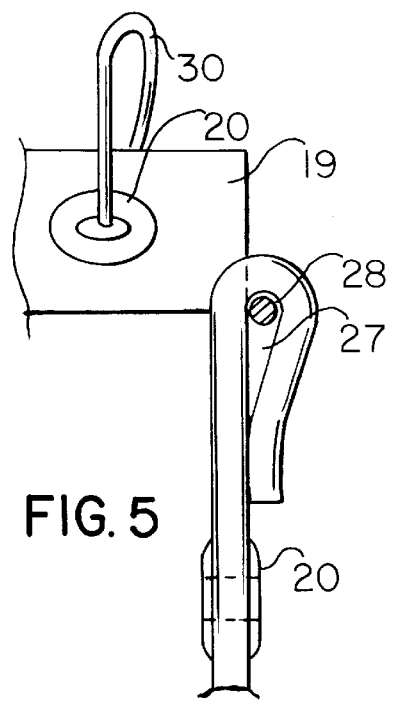
FIG. 5 is a scaled, isolated sectional cross view of the side wall upper peripheral zone shown with an optional to fold over to form a support channel.

Optionally, as shown in section view of FIG. 5, the upper peripheral zone of the side walls 13 and 14 may be folded over and sewn, stitched, heat welded and/or otherwise adjoined back upon itself to create a tubular like support channel 27 extending the entire length of each upper peripheral side wall above the eyelets 20 which is open at one or both ends. After the catch bag 10 is located into position under the engine 11 and/or transmission 12, metal or plastic rods 28 may be inserted into the support channel 27 to add rigidity and longitudinal support to the catch bag 10.

Referring to FIG. 2, a flexible hose 21 is fitted to the catch bag at a preferred location so that engine fluid captured in the chamber 17 will flow by gravity through the hose to a collection bladder 22 removably fitted to a distal end of the hose. A shut-off valve 23 is provided along the hose so that fluid flow through the hose can be interrupted when removing the collection bladder 21 for disposal, thereby preventing hazardous material spills which may otherwise result when the distal end of the hose is disconnected from the bladder. The shut-off valve may be a ball valve, hose crimp or some other means to stop flow of fluid through the hose. In the preferred embodiment, the connection of the hose 21 to the chamber 17 will use a sealed flat washer/nipple assembly 24 and/or other means to unsure leak proof connection. The hose 21 should be of sufficient length to allow easy removal and replacement of bladder 22. At the lower end of the hose 21 past the point of the shut-off valve, a metal, plastic or rubber adaptor 25 may be provided to allow connection of the bladder 22 to the hose assembly. The bladder 22 is formed of a collapsible material, such as plastic, which will allow for non-restricted expansion as it fills. Additionally, the bladder 22 may be sealed with a tie wrap, rubber band or other means prior to removal from adaptor 25 to prevent spillage thereupon.

Figure 6:
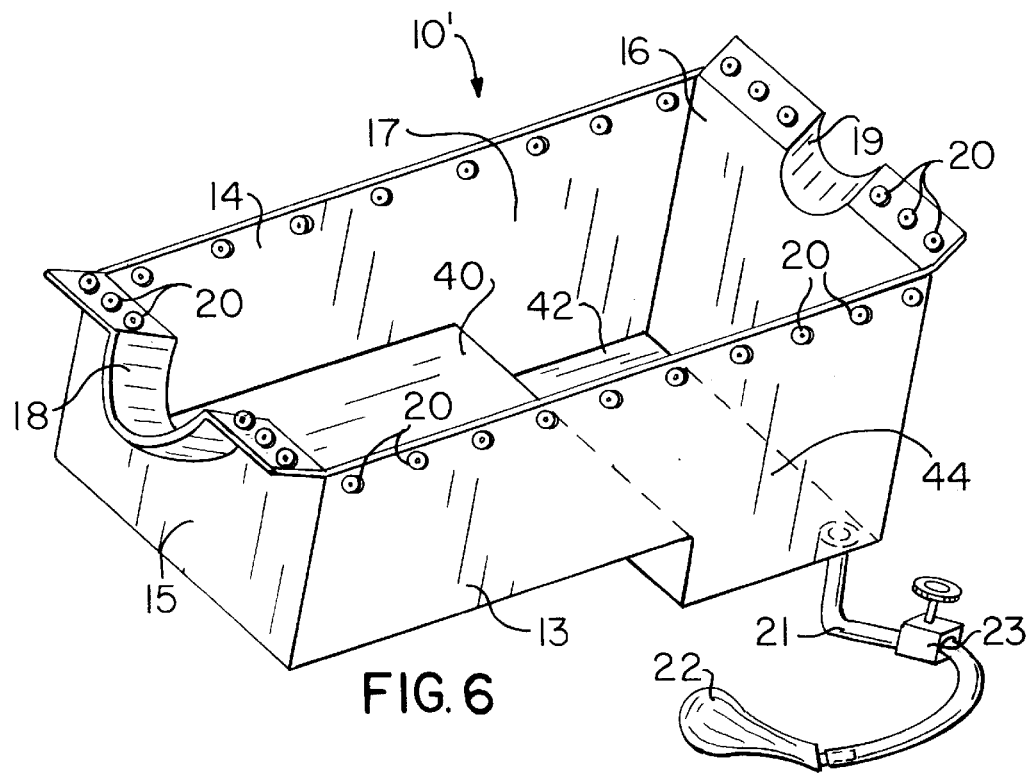
FIG. 6 is a top perspective view of an alternative embodiment of the engine fluid catch bag.

FIG. 6 illustrates another embodiment of the engine fluid catch bag, generally indicated as 10', wherein the floor 42 at a rear portion of the capture chamber 17 is lower or deeper than the floor 40 throughout a remainder of the chamber. This deepened zone or sump 44 serves to limit movement of fluids captured therein due to the reduced length of the chamber 17 within the sump 44. This is useful on vessels that encounter rough seas, wherein the fluids within the catch bag 10' are caused to slosh about the chamber due to the rolling and pitching motion of the vessel. In this instance, the sump 44 serves to limit the free surface area of the fluids, thereby minimizing splashing and spill-over.

While the instant invention has been shown and described in what is considered to be preferred and practical embodiments thereof, it is recognized that departures may be made within the spirit and scope of the present invention which, therefore, should not be limited excepted as set forth in the following claims and under the doctrine of equivalents.

Now that the invention has been described,

What is claimed is:

1. An apparatus for collecting fluids which drip from an engine, comprising:
    a catch bag formed of a flexible material which is impervious to the penetration of liquid and including a plurality of walls extending upwardly from a bottom thereof, said plurality of walls including upper peripheral edges surrounding an open top of an interior chamber of said catch bag;
    said plurality of walls being structured and disposed to extend upwardly in surrounding relation to the engine to contain a volume of liquid therein and to prevent spilling of the volume of liquid over said upper peripheral edges upon pitching and rolling movement of the engine and said catch bag;
    a bladder interconnected in fluid flow communication with said interior chamber for collecting and containing fluids which drip from said engine and into said interior chamber;
    valve means for selectively interrupting flow of the fluids from said interior chamber to said bladder;
    means for draining the collected fluids from said bladder for disposal thereof; and
    means for supporting said catch bag below the engine so that said plurality of side walls extend upwardly from said bottom with said upper peripheral edges extending along the sides, front and rear of the engine.

2. An apparatus as recited in claim 1 wherein said plurality of walls include opposite side walls, a front wall, and a rear wall, extending upwardly and perpendicular to said bottom of said catch bag.

3. An apparatus as recited in claim 2 wherein said front and rear walls include outwardly extending lip portions shaped and configured to conform generally to the engine.

4. An apparatus as recited in claimed 3 wherein said lip portions include reinforcing means for maintaining said lip portions at an upwardly angled position so that fluids which drip thereon are directed to said interior chamber of said catch bag.

5. An apparatus as recited in claim 1 further including a flexible conduit extending in fluid communication between said interior chamber of said catch bag and said blade.

6. An apparatus as recited in claim 5 wherein said means for draining the collected fluids from said bladder include means for disconnecting said flexible conduit from said bladder.

7. An apparatus as recited in claim 1 wherein said means for supporting said catch bag include a plurality of eyelets provided at spaced intervals along said upper peripheral edges of said plurality of walls, each of said plurality of eyelets being structured and disposed for attached receipt of an interconnecting element to suspend said catch bag below the engine.

8. An apparatus as recited in claim 1 wherein said bottom of said catch bag includes sump means for limiting free motion of the engine fluid within said interior chamber.

9. An apparatus for collecting fluids which drop from an engine, comprising:
    a catch bag formed of a flexible, liquid impervious material and including a plurality of walls, including opposite side walls, a front wall, and a rear wall, extending upwardly from a bottom of said catch bag, said plurality of walls including upper peripheral edges surrounding an open top of an interior chamber of said catch bag;
    a bladder interconnected in fluid communication with said interior chamber for collecting and containing fluids which drip from said engine and into said interior chamber;
    a shut-off valve provided between said interior chamber and said bladder for selectively interrupting flow of the fluids from said interior chamber to said bladder; and
    means for supporting said catch bag below the engine so that said plurality of walls extend upwardly from said bottom with said upper peripheral edges extending along the sides, front and rear of the engine.

10. An apparatus for collecting fluids which drip from an engine, comprising:
    a catch bag formed of a flexible material and including a plurality of walls extending upwardly from a bottom thereof, said plurality of walls including upper peripheral edges surrounding an open top of an interior chamber of said catch bag;
    said walls including a front wall and a rear wall having upper peripheral edges and having curved members secured therein, said curved members being structured and disposed to extend below and partially surround structure on opposite ends of said engine;
    a bladder interconnected in fluid flow communication with said interior chamber for collecting and containing fluids which drip from said engine and into said interior chamber;
    valve means for selectively interrupting flow of the fluids from said interior chamber to said bladder;
    means for draining the collected fluids from said bladder for disposal thereof; and
    means for supporting said catch bag below the engine so that said plurality of side walls extend upwardly from said bottom within said upper peripheral edges extending along the sides, front and rear of the engine.

11. An apparatus as recited in claim 10 wherein said bottom of said catch bag includes a portion which lies at a lower level than a remainder of said bottom, said means for draining being coupled to said portion of said bottom whereby collective fluids can be removed from said catch bag.

12. An apparatus as recited in claim 11 wherein said curved members are positioned and disposed in an upwardly angled position so that fluids which drip thereon are directed to said interior chamber of said catch bag.

13. An apparatus for collecting fluids which drip from an engine, comprising:

a catch bag formed of a flexible material which is impervious to the penetration of liquid and including a plurality of walls extending upwardly from a bottom thereof, said plurality of walls including upper peripheral edges surrounding an open top of an interior chamber of said catch bag;

said walls including a front wall and a rear wall having upper peripheral edges and having curved members secured therein, said curved members being structured and disposed to extend below and partially surround structure on opposite ends of said engine;

said bottom of said catch bag including a portion which lies at a lower level than a remainder of said catch bag and defining a sump for limiting free motion of fluid contained therein;

a bladder interconnected in fluid flow communication with said interior chamber for collecting and containing fluids which drip from said engine and into said interior chamber;

valve means for selectively interrupting flow of the fluids from said interior chamber to said bladder;

means for draining the collected fluids from said bladder for disposal thereof; and means for supporting said catch bag below the engine so that said plurality of side walls extend upwardly from said bottom within said upper peripheral edges extending along the sides, front and rear of the engine.

\* \* \* \* \*